W. H. MINER.
FRICTION DRAFT GEAR FOR RAILROAD CARS.
APPLICATION FILED AUG. 19, 1916.
1,252,359.
Patented Jan. 1, 1918.
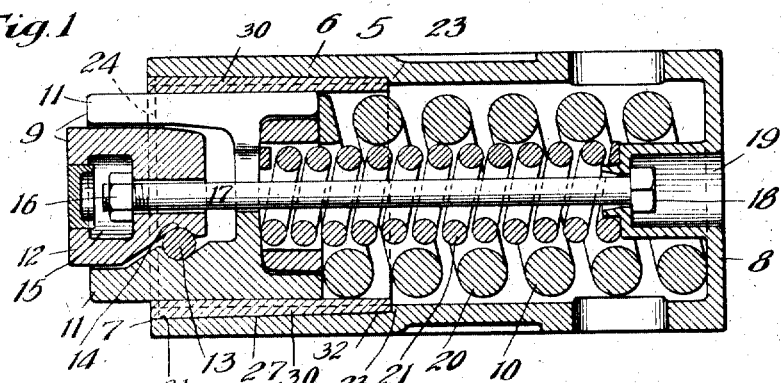
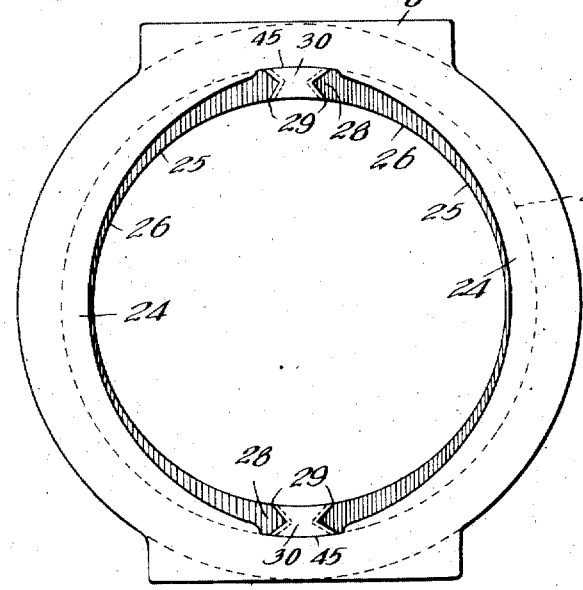
WITNESS.
Wm. Geiger
INVENTOR.
William H. Miner
BY George D. Haight
ATTORNEY

UNITED STATES PATENT OFFICE.

WILLIAM H. MINER, OF CHAZY, NEW YORK.

FRICTION DRAFT-GEAR FOR RAILROAD-CARS.

1,252,359.　　Specification of Letters Patent.　　Patented Jan. 1, 1918.

Application filed August 19, 1916. Serial No. 115,872.

*To all whom it may concern:*

Be it known that I, WILLIAM H. MINER, a citizen of the United States, residing at Chazy, in the county of Clinton and State of New York, have invented a certain new and useful Improvement in Friction Draft-Gears for Railroad-Cars, of which the following is a full, clear, concise, and exact description, reference being had to the accompanying drawings, forming a part of this specification.

My invention relates to improvements in friction draft gear for railroad cars.

One object of my invention is to provide a durable friction draft gear. A further object is to provide a friction draft gear having a friction shell with a removable and renewable friction face, and other objects will appear from the description of the device herein following.

In the drawings forming a part of this specification, Figure 1 is a vertical longitudinal section of a draft gear embodying my invention. Fig. 2 is an enlarged end elevation of the friction shell. Fig. 3 is a perspective view of a locking key. Fig. 4 is an end elevation of a modification, and Fig. 5 is a detail section of the structure shown in Fig. 4 and taken on the line 5—5 thereof.

Referring to the drawings, the numeral 5 indicates a draft gear having a shell 6, preferably of hollow cylindrical shape, and open at its front end 7 and closed at its rear end by the preferably integral plate 8. Within the shell are disposed the friction elements 9 and the spring elements 10. The friction elements 9 comprise a plurality of friction shoes 11, preferably three in number in annular arrangement within the shell, a wedge or spreader member 12 for said shoes, and anti-friction rollers 13 mounted between each of the shoes and an adjacent wedging face 14 of the wedge. The wedge is provided at its outer end with a chamber 15 adapted to receive the nut 16 which is threaded upon the forward end of the connecting rod 17, the connecting rod being provided at its rear end with a head 18, which is received within the recess 19 provided in the rear plate 8 of the shell. The spring members 10 preferably comprise an outer spring 20 and an inner spring 21 nested therein, the said springs being seated at their rear ends against the wall 8 of the shell and at their forward ends against the friction shoes. The internal friction portion of the shell extends from its forward end 7 rearwardly a sufficient distance to permit the inward travel of the friction shoes upon compression of the parts within the gear, this portion of the shell being rearwardly provided with an internal shoulder 23 and a forward shoulder 24, thus forming between the two shoulders an annular groove within the shell to receive the removable friction plates or liners 25.

In the form shown in Figs. 1, 2 and 3, the liner consists of a plurality (preferably two) of sections or shoes 26 suitably curved to engage at their outer faces 27 against the face of the annular groove within the shell and provided along their edges with the wedge shaped portions 28, suitably spaced apart as at 29—29 to receive the correspondingly shaped and longitudinally tapered dovetail key 30 which extends lengthwise of the shell and locks the said members within the shell. The forward shoulder 24 is suitably discontinued at the portions 45—45 for the insertion of the dovetail keys to permit their longitudinal passage into position, as clearly shown in Fig. 2 of the drawings.

In assembling the parts of the draft gear, the liner is first placed in the shell, the sections being inserted through the forward opening of the shell into their position within the annular groove, and when so mounted the keys 30 are driven longitudinally and wedged in position, thus locking the liner securely within the shell. If desired, different material from that of the shell may be employed in the liner, and upon the wearing of the liner, through the frictional action of the shoes thereon, the same may be, when desired, easily removed and a new liner inserted. As illustrated in Fig. 1 of the drawings, the liner has a constant internal diameter from end to end, but the external diameter at its forward end 31 is greater than its external diameter at its rearward end 32, thus forming a liner that upon its outer surface is tapered rearwardly to permit the easy insertion of the liner and insure a fit of the liner within the shell.

In the modification shown in Figs. 4 and 5, the friction shell is provided with a shoulder 123 approximately at the inner edge of the friction surface and also with an under-cut recess or groove 122 at its outer edge. These shoulders coöperate with the inner edge 124 of a continuous liner 130 and an annular flange 125 at its outer edge, respectively. The liner 130 has its exterior surface tapered and the opposed surface of the friction cylinder is similarly tapered.

In actual practice, the liner 130 is inserted within the cylinder as far as possible by hand and then is driven home under a heavy pressure, as for instance by a hydraulic ram. In this manner, the liner is securely wedged in place and will be prevented from becoming loose in the operation of the gear. The interior surface of the liner 130 is, of course, made of true, cylindrical form.

I claim:

1. In a draft gear for railroad cars, a shell, friction elements within the shell, a liner adapted to be engaged by the friction lements, the said liner comprising a plulity of sections, and wedge shaped dovetail keys engaging the edges of said sections.

2. In a friction draft gear for railroad cars, a shell, friction elements including friction shoes within the shell, a liner for frictional engagement with said shoes, the liner comprising a plurality of sections, and longitudinally extending keys engaging the edges of said sections.

3. In a draft gear for railroad cars, a shell, friction elements including friction shoes within the shell, a removable liner for engagement with the said friction shoes, the said liner comprising a plurality of sections, the shell being provided with an annular groove to receive said sections, and longitudinally extending keys engaging the edges of said sections.

4. In a draft gear for railroad cars, a shell, friction elements including friction shoes within the shell, a removable liner engaged by said friction shoes, the shell having an annular groove to receive said liner, the liner comprising a plurality of members, and keys engaging the adjacent edges of said members to lock them together.

5. In a draft rigging for railroad cars, a shell, friction elements including friction shoes within the shell, a liner for said shell frictionally engaged by the friction shoes, the said shell and the outer portion of said liner being rearwardly tapered.

6. As an article of manufacture, a friction shell for railway draft riggings, said shell having an inner liner acting as the friction surface for coöperation with friction elements, the outer surface of said liner being tapered toward the interior of the shell, and the inner surface of the shell being correspondingly tapered, the liner and shell having coöperating engaging shoulders to limit the inward movement of the liner.

In witness that I claim the foregoing I have hereunto subscribed my name this 16th day of Aug. 1916.

WILLIAM H. MINER.